(12) United States Patent
Peng

(10) Patent No.: US 11,477,292 B1
(45) Date of Patent: Oct. 18, 2022

(54) DIGITAL PHOTO FRAME, A SYSTEM THEREOF, AND A METHOD THEREOF

(71) Applicant: Maykis Technology Limited, Hong Kong (CN)

(72) Inventor: Chao Peng, Shenzhen (CN)

(*) Notice: Subject to any disclaimer, the term of this patent is extended or adjusted under 35 U.S.C. 154(b) by 0 days.

(21) Appl. No.: 17/390,196

(22) Filed: Jul. 30, 2021

(51) Int. Cl.
*G06F 15/16* (2006.01)
*H04L 67/146* (2022.01)
*G06K 19/06* (2006.01)
*G06F 3/147* (2006.01)
*H04L 67/12* (2022.01)
*H04L 67/01* (2022.01)

(52) U.S. Cl.
CPC ............ *H04L 67/146* (2013.01); *G06F 3/147* (2013.01); *G06K 19/06037* (2013.01); *H04L 67/01* (2022.05); *H04L 67/12* (2013.01)

(58) Field of Classification Search
CPC ....... H04L 67/146; H04L 67/12; H04L 67/42; G06F 3/147; G06K 19/06037
See application file for complete search history.

(56) References Cited

U.S. PATENT DOCUMENTS

| 6,442,573 | B1* | 8/2002 | Schiller | H04L 51/066 715/209 |
| 2010/0022218 | A1* | 1/2010 | Chen | H04N 1/00129 455/411 |
| 2012/0127196 | A1* | 5/2012 | Landry | G06F 3/147 345/619 |
| 2013/0055079 | A1* | 2/2013 | Liao | G06F 16/58 715/701 |

* cited by examiner

*Primary Examiner* — Normin Abedin
(74) *Attorney, Agent, or Firm* — Lempia Summerfield Katz LLC

(57) ABSTRACT

The present disclosure provides a method for sharing photos or videos with a digital photo frame, the method comprising receiving, by a server, an operation command for connecting at least one terminal to the digital photo frame; generating and transmitting, by the server, a code to the digital photo frame in response to the received operation command; determining, by the server, whether a code entered by the at least one terminal is matched with the generated code; connecting, by the server, the at least one terminal to the digital photo frame when determining that the code entered by the at least one terminal is matched with the generated code; and instructing, by the server, the digital photo frame to receive the photos or the videos from the at least one connected terminal.

20 Claims, 9 Drawing Sheets

DIGITAL PHOTO FRAME, A SYSTEM THEREOF, AND A METHOD THEREOF

FIELD

The present disclosure relates to a digital photo frame, a system thereof, and a method thereof. In particular, the present disclosure relates to a digital photo frame, a system thereof, and a method thereof for displaying photos shared by at least one terminal connected to the digital photo frame.

BACKGROUND

The digital era has a transformative power to connect people across the world. A person may use electronic devices such as cell phones, tablets, cameras to create and share a large number of photos/videos, recording their daily lives and exciting moments, with others on social media platforms. The person may also use messaging applications installed on their electronic devices to transmit the photos/videos to particular recipients, who are also the users of the same messaging applications.

A traditional photo frame may only display one or a limited number of printed photos. Due to a large number of the digital photos, the traditional photo frame cannot meet the need of a person, who wants to display the numerous photos stored in the users' electronic devices. In addition, the traditional photo frame cannot display videos stored in the electronic devices.

Some digital photo frames have emerged to display the photos/videos for the users. The digital photo frames may retrieve the photos/videos from the users' electronic devices (e.g. cell phones, tablets, or cameras) or social media accounts. When an owner of such a digital photo frame wants to display the photos/videos sent from another person, the owner has to save the photos/videos sent from another person in the owner's electronic devices. However, the photos/videos sent from another person consume the storage space of the owner's electronic devices. In addition, when the owner of the such a digital photo frame receives the photos/videos from multiple senders, the owner has to receive the photos/videos separately from each sender. Thus, displaying the photos/videos received from multiple resources is a time-consuming process. Therefore, there is a need to provide a more convenient digital photo frame functioning as a hub to directly collect the photos/videos from different resources. Thus, the storage space of the owner's electronic devices may be saved and the time the owner spends in collecting the photos/videos may be decreased.

Furthermore, the owner of such a digital photo frame cannot remotely control the digital photo frame. For example, while working in the office, parents may want to limit the photos/videos displayed to their children at home. However, because such a digital photo frame only allows the parents to directly operate the digital photo frame, the parents in the office cannot manage the photos/videos to be displayed to the children at home. Therefore, there is a need to provide a more convenient digital photo frame for the owner to manage the photos/videos stored in the digital photo frame or change the settings of the digital photo frame.

SUMMARY

In one aspect, the present disclosure provides a system for sharing photos or videos with a digital photo frame. The system comprises a server configured to generate a code for establishing a connection between the digital photo frame and at least one terminal and configured to receive a code transmitted by the at least one terminal. The system further comprises the digital photo frame configured to be connected to the server via a network. The digital photo frame comprises a controller configured to receive an operation command for generating a code and transmit the received operation command for generating a code to the server via the network. In response to the received operation command for generating a code, the server generates a code and transmits the generated code to the controller of the digital photo frame. The server is further configured to connect the at least one terminal to the digital photo frame when determining that the code entered by the at least one terminal is matched with the generated code. The service is further configured to instruct the digital photo frame to receive the photos or the videos from the at least one connected terminal when the at least one terminal is connected to the digital photo frame.

In another aspect, the present disclosure provides a digital photo frame for receiving photos or videos transmitted from at least one terminal. The digital photo frame comprising: a controller; a communication unit communicably connected to the controller and configured to communicate with a server and the at least one terminal via a network; a display communicably connected to the controller and configured to receive an operation command for generating a code and transmit the operation command to the controller, wherein the code is generated to establish a connection between the digital photo frame and at least one terminal; and a storage communicably connected to the controller and configured to store the received photos or the videos. In response to the operation command transmitted from the display, the controller is configured to request, via the communication unit, the server to generate a code for establishing a connection between the digital photo frame and at least one terminal. In response to the established connection between the digital photo frame and at least one terminal, the controller is further configured to control the communication unit to receive the photos or the videos from the at least one connected terminal and control the storage to store the received photos or the videos.

In another aspect, the present disclosure provides a method for sharing photos or videos with a digital photo frame, the method comprising receiving, by a server, an operation command for connecting at least one terminal to the digital photo frame; generating and transmitting, by the server, a code to the digital photo frame in response to the received operation command; determining, by the server, whether a code entered by the at least one terminal is matched with the generated code; connecting, by the server, the at least one terminal to the digital photo frame when determining that the code entered by the at least one terminal is matched with the generated code; and instructing, by the server, the digital photo frame to receive the photos or the videos from the at least one connected terminal.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
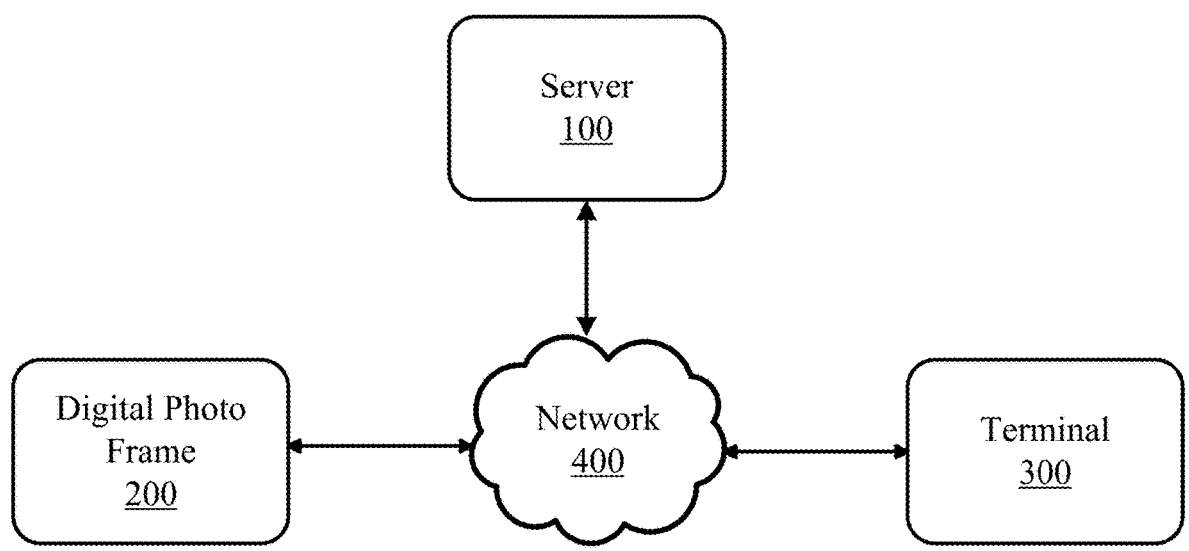
FIG. 1 is a block diagram illustrating a system of the present disclosure comprising a server, a digital photo frame, and a terminal according to an embodiment of the present disclosure.

Hereinafter, specific embodiments of the present disclosure are described in detail with reference to the drawings. In adding the reference numerals to the elements of each drawing, it should be noted that the identical or equivalent element is designated by the identical numeral even when they are displayed on other drawings. Further, in describing the embodiments of the present disclosure, a detailed description of well-known features or functions has been omitted in order not to unnecessarily obscure the gist of the present disclosure.

Unless otherwise defined, all terms used herein, including technical and scientific terms, have the same meaning as those generally understood by those having ordinary skill in the art to which the present disclosure pertains. Such terms as those defined in a generally used dictionary should be interpreted as having meanings equal to the contextual meanings in the relevant field of art and should not be interpreted as having ideal or excessively formal meanings unless clearly defined as having such in the present application.

1. System and Method of Digital Photo Frame

Figure 2:
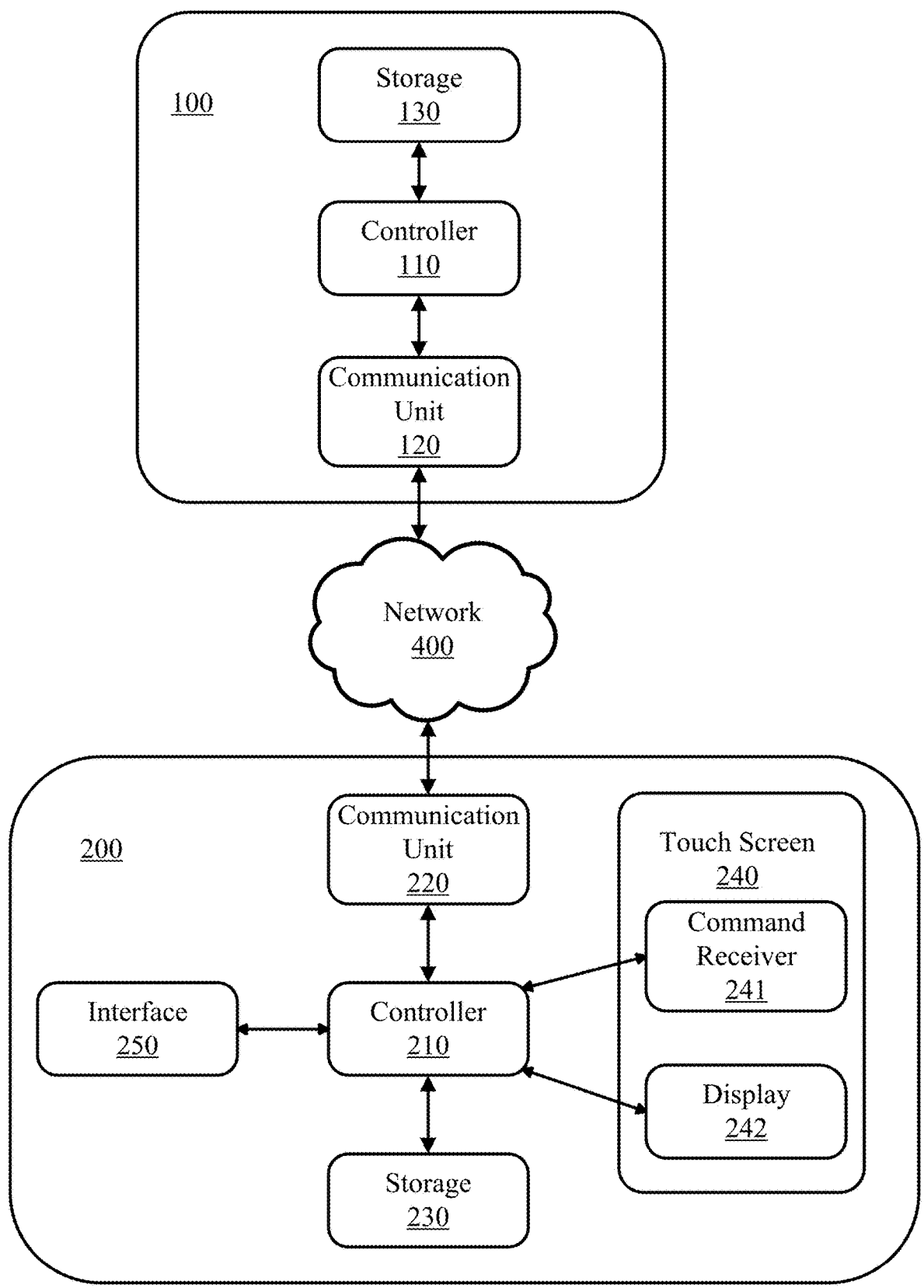
FIG. 2 is a block diagram illustrating a structure of the server and a structure of the digital photo frame and illustrating a communication between the server and the digital photo frame according to an embodiment of the present disclosure.
Figure 3:
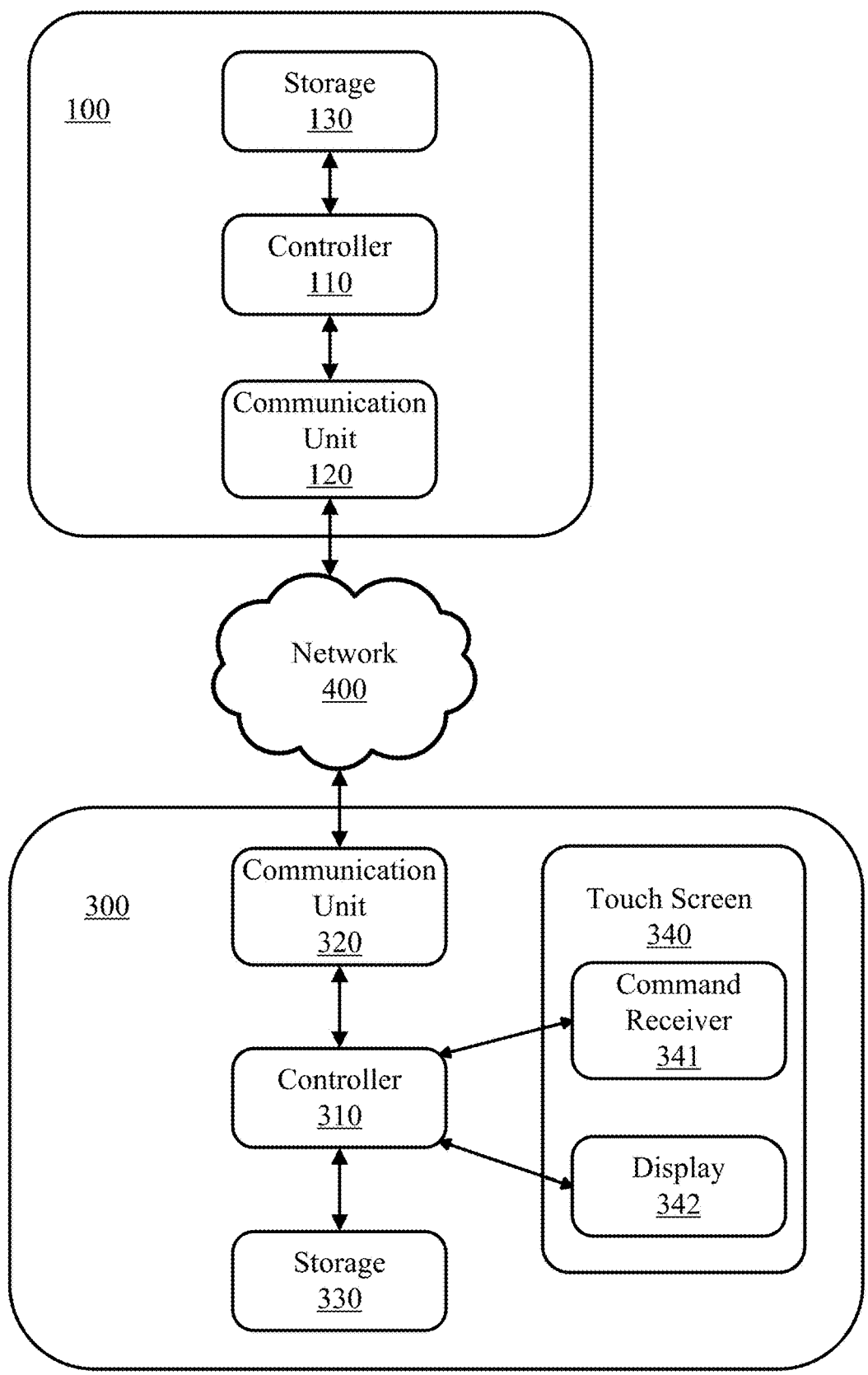
FIG. 3 is a block diagram illustrating a structure of the terminal and illustrating a communication between the server and the terminal according to an embodiment of the present disclosure.
Figure 4:
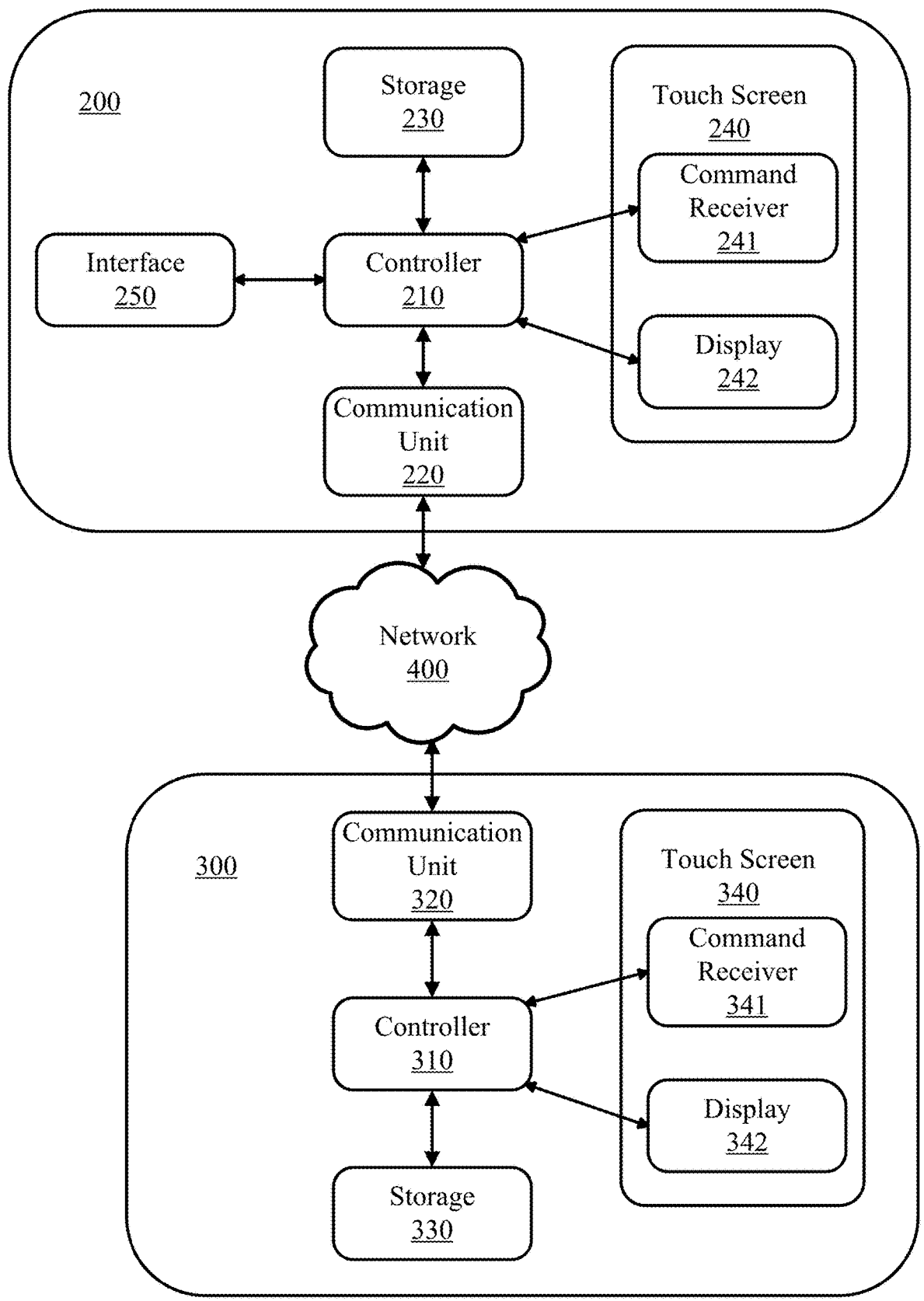
FIG. 4 is a block diagram illustrating a communication between the digital photo frame and the terminal according to an embodiment of the present disclosure.
Figure 5:
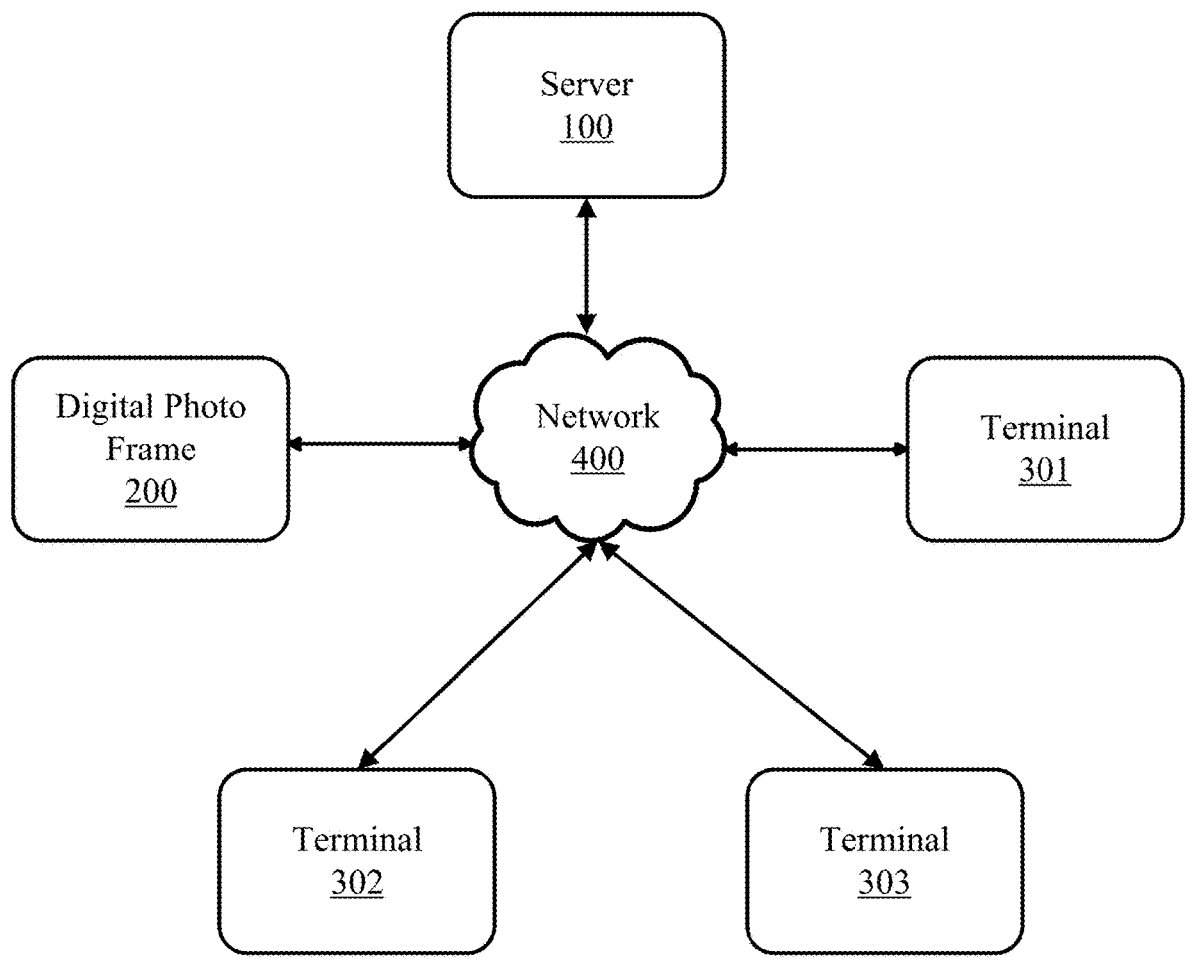
FIG. 5 is a block diagram illustrating a system comprising the server, the digital photo frame, and three terminals according to another embodiment of the present disclosure.

FIG. 1 is a block diagram illustrating a system comprising a server 100, a digital photo frame 200, and a terminal 300 according to an embodiment of the present disclosure. FIG. 2 is a block diagram illustrating a structure of the server 100 and a structure of the digital photo frame 200 and illustrating a communication between the server 100 and the digital photo frame 200 according to an embodiment of the present disclosure. FIG. 3 is a block diagram illustrating a structure of the terminal 300 and illustrating a communication between the server 100 and the terminal 300 according to an embodiment of the present disclosure. FIG. 4 is a block diagram illustrating a communication between the digital photo frame 200 and the terminal 300 according to an embodiment of the present disclosure. FIG. 5 is a block diagram illustrating a system of the present disclosure comprising the server 100, the digital photo frame 200, and three terminals 301, 302, and 303 according to another embodiment of the present disclosure.

1.1 Server

Referring to FIG. 1, FIG. 2, and FIG. 3, the server 100 according to an embodiment comprises a controller 110 configured to perform functions according to instructions, a communication unit 120 communicably connected to the controller 110, and a storage 130 communicably connected to the controller 110. In this embodiment, the controller 110, the communication unit 120, and the storage 130 are separate components. In another embodiment, the controller 110, the communication unit 120, and the storage 130, may be integrated into one component and each of them may be communicated with the other via a bus.

In an embodiment, the controller 110 is configured to control a connection between the digital photo frame 200 and the terminal 300 and control a photo/video transmission between the digital photo frame 200 and the terminal 300. The controller 110 is further configured to register the terminal 300 and register the connected digital photo frame 200 and store the registration information in a database of the storage 130. The controller is further configured to assign different access levels to the registered digital photo frame 200 and the connected terminal 300. The controller 110 is further configured to generate and push notifications/alerts to the registered digital photo frame 200 and the connected terminal 300 via the communication unit 120. These functions are described below in more details.

The controller 110 in the present disclosure can be implemented by any appliances or by any software or applications run by the appliances. The controller 110 may be connected to a workstation or another external device (e.g., control panel, remote) and/or a database for receiving user inputs, system characteristics, and any of the values described herein. The controller 110 may include a processor. Optionally, the controller 110 may include an input device and/or a sensing circuit in communication with any of the sensors. The sensing circuit receives sensor measurements from as described above. Optionally, the controller 110 may include a drive unit for receiving and reading non-transitory computer media having instructions. Additional, different, or fewer components may be included. The processor is configured to perform instructions stored in memory for executing the algorithms described herein.

The processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

In an embodiment, the communication unit 120 of the server 100 is configured to communicate, via a network 400, with the communication unit 220 of the digital photo frame 200 and the communication unit 320 of the terminal 300. Thus, the communicate unit 120 may transmit an operation command from the digital photo frame 200 to the terminal 300 or transmit an operation command from the terminal 300 to the digital photo frame 200.

The communication unit 120 may include any operable connection, ingress ports, and egress ports. An operable connection may be one in which signals, physical communications, and/or logical communications may be sent and/or received. An operable connection may include a physical interface, an electrical interface, and/or a data interface. The communication unit 120 may be connected to a network 400. The network 400 may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network 400 may be a public network, such as the Internet, a private network, such as an intranet, or combinations thereof, and may utilize a variety of networking protocols now available or later developed including, but not limited to TCP/IP based networking protocols.

In an embodiment, the storage 130 of the server 100 is configured to store photos/videos received by the server 100. The storage 130 may include one or more devices (e.g., memory units, memory devices, storage devices, etc.) for storing data and/or computer code for completing and/or facilitating the various processes described in the present disclosure. The storage 130 may include random access memory (RAM), read-only memory (ROM), hard drive storage, temporary storage, non-volatile memory, flash memory, optical memory, or any other suitable memory for storing software objects and/or computer instructions. The storage 130 may include database components, object code components, script components, or any other type of information structure for supporting the various activities and information structures described in the present disclosure. The storage 130 may be communicably connected to processor via a processing circuit and may include computer code for executing (e.g., by processor) one or more processes described herein. For example, the storage 130 may include graphics, web pages, HTML files, XML files, script code, shower configuration files, or other resources for use in generating graphical user interfaces for display and/or for use in interpreting user interface inputs to make command, control, or communication decisions.

1.2 Digital Photo Frame

Also referring to FIG. 1 and FIG. 2, the digital photo frame 200 according to an embodiment comprises a controller 210 configured to perform functions according to instructions, a communication unit 220 communicably connected to the controller 210, a storage 230 communicably connected to the controller 210, a touch screen 240 communicably connected to the controller 210, and an interface 250 communicably connected to the controller 210. In this embodiment, the controller 210, the communication unit 220, and the storage 230 are separate components. In another embodiment, the controller 210, the communication unit 220, and the storage 230, may be integrated into one component and each of them may be communicated with the other via a bus.

In an embodiment, the controller 210 of the digital photo frame 200 is configured to control the digital photo frame 200 to display and manage photos/videos stored in the digital photo frame 200 according to the instructions. An owner of the digital photo frame 200 (hereinafter "owner") may transmit the instructions by directly inputting operation commands on the touch screen 240, which are described below in more details. A user of the terminal 300 may also send the instructions to the digital photo frame 200 (hereinafter "users") via the network 400 by inputting operation commands on the touch screen 340. According to the received instructions, the controller 210 may generate control signals and transmit the generated control signals to the terminal 300 or the server 100 via the communication unit 220. In another embodiment, the controller 210 may perform the same function as the controller 110 and the controller 110 may change the functions performed by the controller 210.

The controller 210 in the present disclosure can be implemented by any appliances or by any software or applications run by the appliances.

The controller 210 may have the same structure and functions as the controller 110 of the server 100 as discussed above. The above discussion related to the controller 110 is incorporated herein by reference.

In an embodiment, the communication unit 220 of the digital photo frame 200 is configured to communicate, via the network 400, with the terminal 300 or the server 100 by receiving the instructions from the terminal 300 or the server 100 and transmitting the control signals generated by the controller 210 to the terminal 300 or the server 100. When receiving the instructions from the terminal 300 or the server 100, the communication unit 220 transmits the received instructions to the controller 210 for further processing. When the controller 210 processes the instructions and generates the corresponding control signals, the communication unit 220 may transmit the control signals from the controller 210 to the terminal 300 or the server 100 via the network 400.

The communication unit 220 may have the same structure and functions as the communication unit 120 of the server as discussed above. The above discussion related to the communication unit 120 is incorporated herein by reference.

In an embodiment, the storage 230 of the digital photo frame 200 is configured to store photos/videos received by the digital photo frame 200. The storage 230 may have the same structure and functions as the storage 130 of the server 100 as discussed above. The above discussion related to the storage unit 130 is incorporated herein by reference.

In an embodiment, the touch screen 240 of the digital photo frame 200 comprises a command receiver 241 and a display 242 both communicably connected to the controller 210. Although the touch screen 240 is used in this embodiment, other forms of the screen may also be used to perform the functions as discussed in the present disclosure.

The command receiver 241 of the touch screen 240 is configured to receive the operations commands input by the owner through the display 242. The command receiver 241 may provide at least one touch area configured to allow the owner to input the operation commands. The owner may generate the operation commands by using fingers to select desired information within the touch area. When receiving the operation commands from the owner, the command receiver 241 may transmit the received operation commands to the controller 210.

Thus, in response to the received operation commands, the controller 210 may determine whether each operation command is valid. The controller 210 is further configured to store at least one predetermined condition for determining whether each operation command is valid. When the controller 210 determines that the operation command is valid, the controller 210 may perform the function corresponding to the valid operation command. When the controller 210 determines that the operation command is invalid, the controller 210 may transmit a control signal to the display 242 to display words indicating that an error has occurred. The functions are described below in more details.

The display 242 of the touch screen 240 is configured to display the photos/videos stored in the storage 230 and display the at least one touch area configured to allow the owner to input the operation commands. When receiving, from the controller 210 or the controller 110, a control signal to display selected photos or videos, the display 242 may display the selected photos or videos stored in the storage 230 in response to the control signal. When receiving, from the controller 210 or the controller 110, a control signal to notify the owner that the operation command is invalid, the display 242 may display words indicating that an error has occurred in response to the control signal.

In an embodiment, the interface 250 of the digital photo frame 200 is configured to be connected to an external storage device or import the photos/videos from the external storage devices into the digital photo frame 200. In another embodiment, the interface 250 is further configured to export the photos/videos stored in the storage 230 into the external storage device. The external storage device may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

1.3 Terminal

Referring to FIG. 1 and FIG. 3, a terminal 300 according to an embodiment comprises a controller 310 configured to generate instructions to the digital photo frame 200, a communication unit 320 communicably connected to the controller 310, a storage 330 communicably connected to the controller 310, and a touch screen 340 communicably connected to the controller 310. In this embodiment, the controller 310, the communication unit 320, and the storage 330 are separate components. In another embodiment, the controller 310, the communication unit 320, and the storage 330 may be integrated into one component and each of them may be communicated with the other via a bus. In this embodiment, one terminal 300 is illustrated in FIG. 1, but the number of the terminals 300 is not limited to 1. Any number of the terminals 300 may be included in the present disclosure. In another embodiment as illustrated in FIG. 5, three terminals 301, 302, and 303 may be included in the present disclosure. The terminal 300 may be any types of electronic devices, which may communicate with the digital photo frame 200 and send instructions to the digital photo frame 200. In this embodiment, the terminal 300 is a cell phone. In another embodiment, the terminal may be a tablet.

In an embodiment, the controller 310 of the terminal 300 is configured to generate the instructions to be sent to the digital photo frame 200 in response to the operation commands input by the user of the terminal 300.

The controller 310 in the present disclosure can be implemented by any appliances or by any software or applications run by the appliances.

The controller 310 may have the same structure and functions as the controller 110 of the server 100 and the controller 210 of the digital photo frame 200 as discussed above. The above discussion related to the controller 110 is incorporated herein by reference. The operation commands may include, for example, requesting an authenticated connection with the digital photo frame 200, requesting to remove the authenticated connection with the digital photo frame 200, requesting to transmit the photos/videos stored in the storage 330 to the digital photo frame 200, requesting to delete the transmitted photos/videos from the digital photo frame 200, and requesting to control the digital photo frame 200 as a "virtual remote." The operation commands are described below in more details.

In an embodiment, the communication unit 320 of the terminal 300 is configured to communicate, via the network 400, with the communication unit 220 or the communication unit 120 by receiving the control signals from the controller 210 or the controller 110 and transmitting the instructions generated by the controller 310 to the communication unit 220 or the communication unit 120.

The communication unit 320 may have the same structure and functions as the communication unit 120 of the server and the communication unit 220 of the digital photo frame 200 as discussed above. The above discussion related to the communication unit 120 is incorporated herein by reference.

When the communication unit 320 receives the control signals from the digital photo frame 200 or the server 100, the communication unit 320 transmits the received control signals to the controller 310 for further processing. When the controller 310 receives the operation commands input by the user, the controller 310 generates instructions according to the received operation commands and transmits the generated instructions to the communication unit 320. Then, the communication unit 320 may transmit the instructions to the communication unit 220 or the communication unit 120 via the network 400.

In an embodiment, the storage 330 of the terminal 300 is configured to store the photos/videos. The storage 330 may have the same structure and functions as the storage 130 of the server 100 and the storage 230 of the digital photo frame 200 as discussed above. The above discussion related to the storage unit 130 is incorporated herein by reference.

In an embodiment, the touch screen 340 of the terminal 300 comprises a command receiver 341 and a display 342 both communicably connected to the controller 310. The touch screen 340 may have the same structure and functions as the touch screen 240 of the digital photo frame 200 as discussed above. The above discussion related to the touch screen 240 is incorporated herein by reference.

Although the touch screen 340 is used in this embodiment, other forms of the screen may also be used to perform the functions as discussed in the present disclosure.

2. Functions Performed by the System of Digital Photo Frame

Various aspects of the system of digital photo frame are described in more details hereinafter. As discussed above, the system of the present disclosure comprising the server 100, the digital photo frame 200, and the terminal 300 according to an embodiment. The above discussion related to the server 100, the digital photo frame 200, and the terminal 300 are incorporated herein by reference.

Figure 6A:
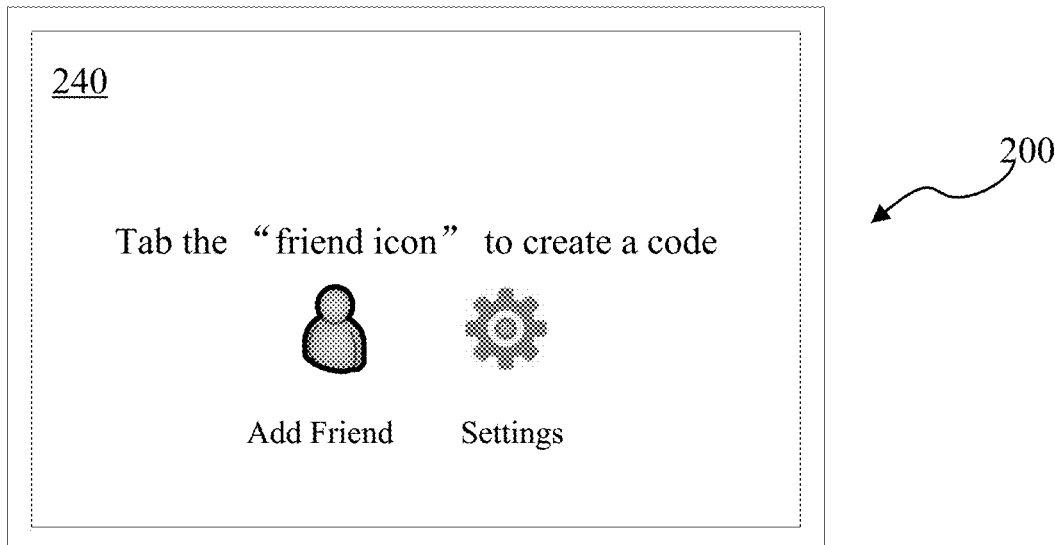
FIG. 6A illustrates a screen displaying a guidance for the owner of the digital photo frame to add a friend according to an embodiment of the present disclosure.
Figure 6B:
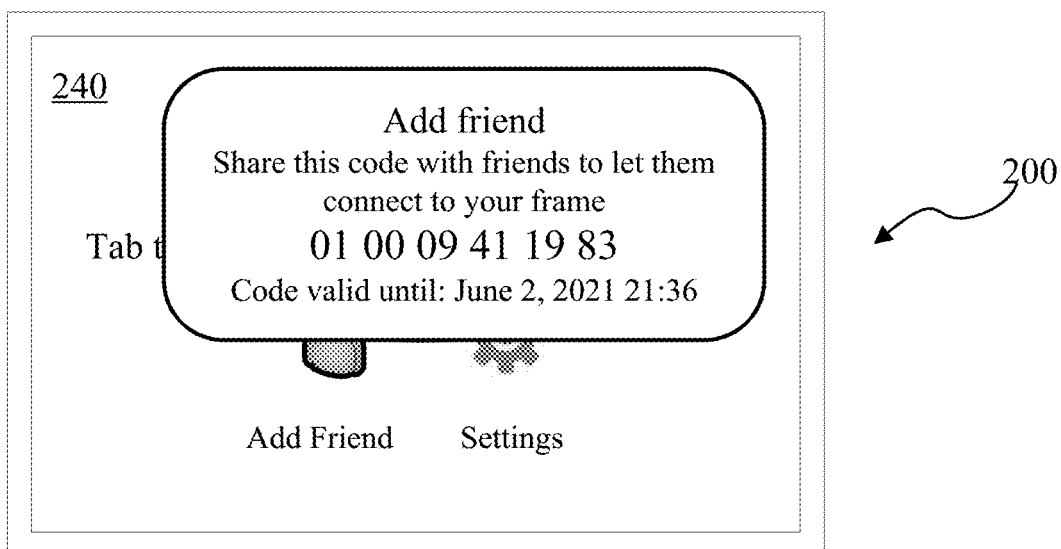
FIG. 6B illustrates the screen displaying a code generated by the server and a guidance for the owner of the digital photo frame to share the generated code with a friend according to an embodiment of the present disclosure.
Figure 7A:
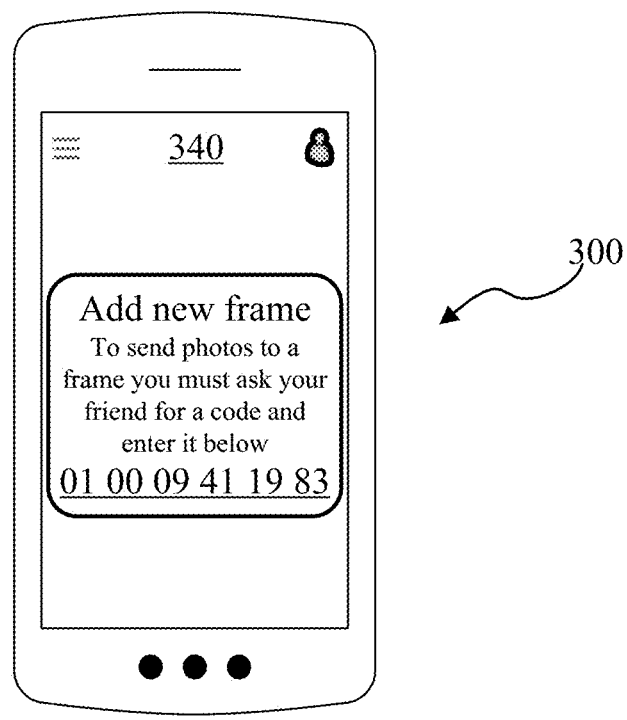
FIG. 7A illustrates a screen displaying a guidance for the user of the terminal to enter the code shared by the owner of the digital photo frame according to an embodiment of the present disclosure.
Figure 7B:
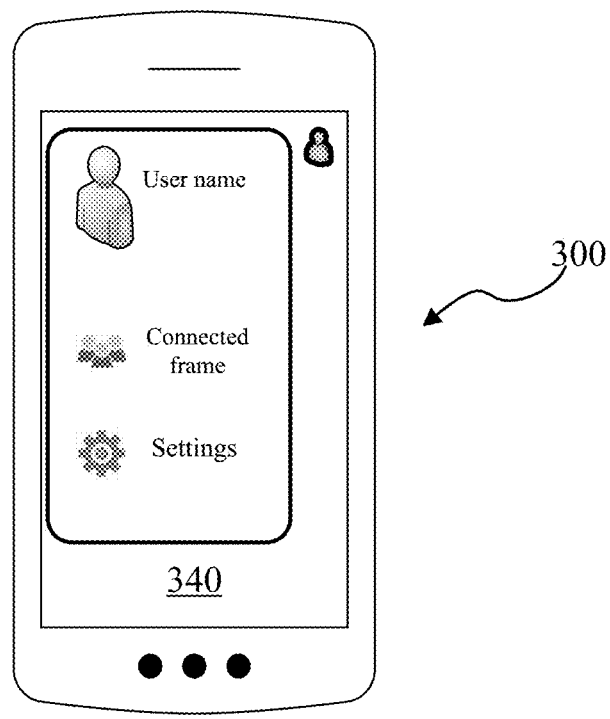
FIG. 7B illustrates the screen displaying a "connected frame" icon to allow the user of the terminal to check the connected digital photo frame according to an embodiment of the present disclosure.
Figure 8:
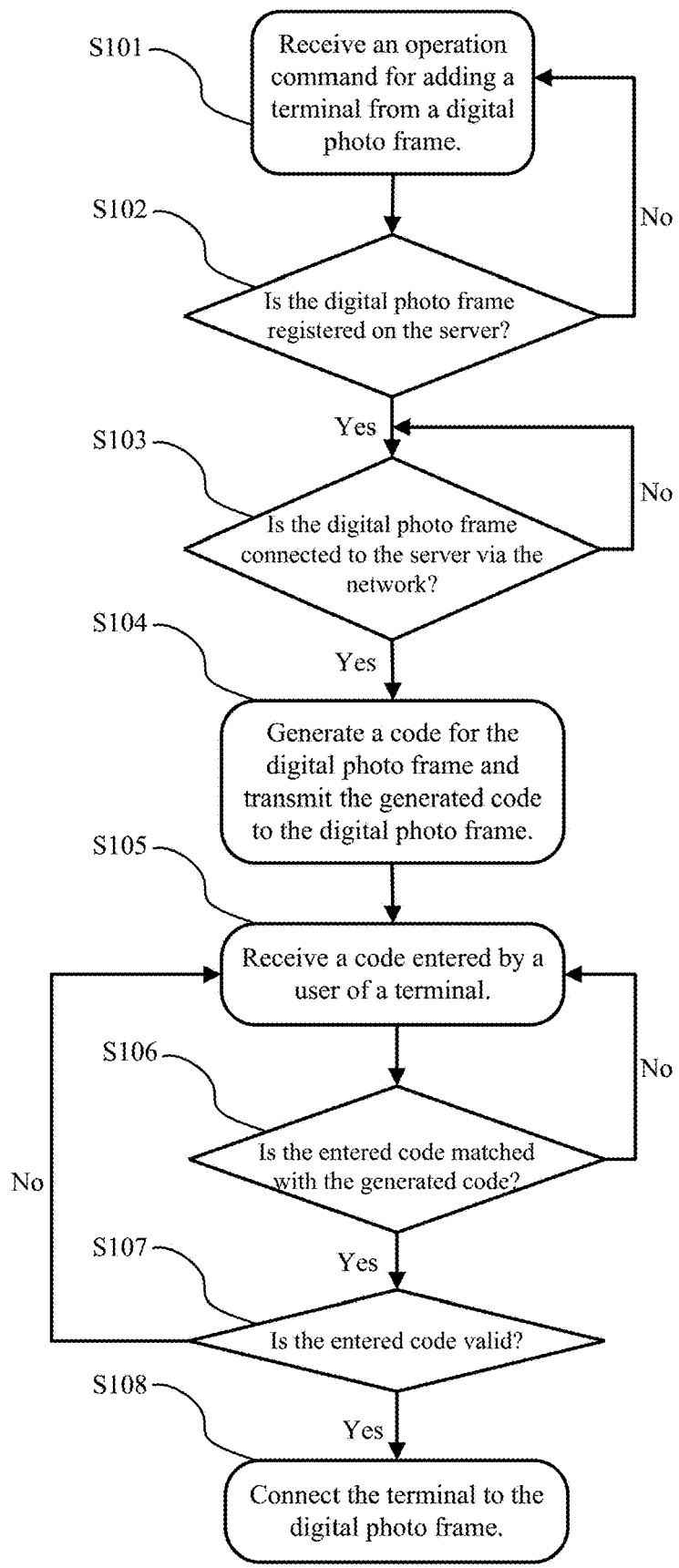
FIG. 8 illustrates a method of establishing an authenticated connection between the digital photo frame and the terminal according to an embodiment of the present disclosure.

2.1 Establishing an Authenticated Connection Between the Digital Photo Frame and the Terminal FIG. 6A illustrates the touch screen 240 displaying a guidance for the owner of the digital photo frame 200 to add a friend according to an embodiment of the present disclosure. FIG. 6B illustrates the touch screen 240 displaying a code generated by the server 100 and a guidance for the owner of the digital photo frame 200 to share the generated code with a friend according to an embodiment of the present disclosure. FIG. 7A illustrates the touch screen 340 displaying a guidance for the user of the terminal 300 to enter the code shared by the owner of the digital photo frame 200 according to an embodiment of the present disclosure. FIG. 7B illustrates the touch screen 340 displaying a "connected frame" icon to allow the user of the terminal 300 to check the connected digital photo frame 200 according to an embodiment of the present disclosure. FIG. 8 illustrates a method of establishing an authenticated connection between the digital photo frame 200 and the terminal 300 according to an embodiment of the present disclosure.

A terminal 300 may transmit the photos/videos to a digital photo frame 200 after the server 100 successfully authenticates the terminal 300 and establishes the connection between the digital photo frame 200 and the terminal 300 (hereinafter "authenticated connection"). To authenticate the terminal 300, the server 100 may generate a unique code and transmit the generated code to the terminal 300.

Specifically, referring to FIG. 2, FIG. 6A, FIG. 6B, FIG. 7A, FIG. 7B, and FIG. 8, to add a terminal 300 to the digital photo frame 200, the owner of the digital photo frame 200 may click an "Add Friend" icon on the touch screen 240 to generate an operation command for adding a terminal 300. In an embodiment, at act S101, the controller 110 of the server 10 receives the operation command for connecting a terminal 300 to the digital photo frame 200. Specifically, the controller 210 receives the generated operation command via the command receiver 241. The controller 210 then transmits the generated operation command to the communication unit 220, which then transmits the generated operation command to the communication unit 120 of the server 100. The communication unit 120 then transmits the generated operation command to the controller 110 to generate a code as requested by the owner of the digital photo frame 200.

In this embodiment, at act S102, before the controller 110 generates the code for a digital photo frame 200, the controller 110 verifies whether the operation command for adding a terminal 300 is sent from a digital photo frame 200 registered on the server 100. Each digital photo frame 200 must be registered on the server 100 before the digital photo frame 200 is sold to a buyer. This may be performed by the manufacturer, the seller, or the buyer. The controller 110 may assign an identification number to the registered digital photo frame 200 and store the identification number, for example, in a database of the storage 130. In another embodiment, the controller 110 may read the serial number of the registered digital photo frame 200 and save the serial number in the database. When the controller 110 receives the operation command for adding a terminal 300 from a digital photo frame 200, the controller 110 retrieves the serial number of the digital photo frame 200 and searches whether the serial number is present in the database. When the serial number of the digital photo frame 200 is present in the database, the controller 110 determines that the digital photo frame 200 has been registered on the server 100 and the method proceeds to act S103. The controller 110 may use the retrieved the serial number to search the corresponding identification number of the digital photo frame 200. When the serial number of the digital photo frame 200 is not present in the database, the controller 110 determines that the digital photo frame 200 has not been registered on the server 100. Thus, the method returns to act S101 for receiving a new operation command for adding a terminal 300 from another digital photo frame. In another embodiment, the controller 210 may control the display 242 to alert the owner of the digital photo frame 200 that an error has occurred.

At act 103, the controller 110 determines whether the digital photo frame 200 is connected to the server 100 via the network 400. For example, the communication unit 120 of the server 100 may send a message to the communication unit 220 of the digital photo frame 200. When the controller 110 receives a response from the digital photo frame 200, the controller 110 determines that the digital photo frame 200 is connected to the server 100 via the network 400 and the method proceeds to act S104. When the controller 110 does not receive a response from the digital photo frame 200, the controller 110 determines that the digital photo frame 200 is not connected to the server 100 via the network 400. Thus, the method returns to act S103 so that the controller 110 continues to determine whether the digital photo frame 200 is connected to the server 100 via the network 400 until the controller 110 determines that the digital photo frame 200 is connected to the server 100.

At act S104, the controller 110 generates a code for the digital photo frame 200. The code of the present disclosure may be a unique code. In other words, the controller 110 may generate a different code every time the controller 110 receives an operation command for adding a terminal 300.

Specifically, the code of the present disclosure may be a device-specific code. In an embodiment, the code may be specific to the digital photo frame 200 according to this embodiment. As illustrated in FIG. 6B, the code generated by the controller 110 may be a numeral code comprising twelve digits. The first and second digits represent an identification number of the digital photo frame 200. For example, the identification number of the digital photo frame 200 may be a number assigned by the controller 110 and stored in the database when the digital photo frame 200 is registered on the server 100. When the identification number includes more than 2 digits, the controller 110 may choose 2 consecutive digits from the identification number. When the identification number includes only one digit, the controller 100 may automatically add one digit, e.g. "0," before the identification number so that 2 digits may be included to form the code.

The third to eighth digits represent a serial number of the digital photo frame 200. When the identification number includes more than 6 digits, the controller 110 may choose 2 consecutive digits from the serial number. When the identification number includes less than 6 digits, the controller 100 may automatically add the corresponding number of digits, e.g. "0," before the serial number so that 6 digits may be included to form the code.

The ninth to twelfth digits represent a random code.

In another embodiment, the controller 110 may use other device information of the digital photo frame 200 to form the code. For example, the device information may comprise an IP address and/or a username of the digital photo frame 200. In another embodiment, the controller 110 may use the environment information of the digital photo frame 200. For example, the controller 110 may determine the location and/or the time zone of the digital photo frame 200 according to the IP address of the digital photo frame 200.

In another embodiment, the code may be longer than twelve digits to improve the security for the connection between the digital photo frame 200 and the terminal 300. For example, when the identification number of the digital photo frame 200 includes more than 2 digits, the entire identification number may be included in the generated code and thus the total length of the generated code may be extended. Likewise, when the serial number of the digital photo frame 200 includes more than 6 digits, the entire serial number may be included in the generated code and thus the total length of the generated code may be extended.

In another embodiment, a different combination or sequence of the above discussed information may be used to form the code.

In another embodiment, the owner of the digital photo frame 200 may request the controller 110 to refresh the code, e.g. generate a new code.

Because the code is specific to the digital photo frame 200 and also comprises four digits of the random code, the controller 110 cannot generate an identical code for a different digital photo frame 200. Therefore, the device-specific code of the present disclosure may prevent the terminal 300 from connecting to a different digital photo frame 200 by using the code and thus improve the security for the connection between the digital photo frame 200 and the terminal 300.

In addition, although two codes, generated at different times, for a particular digital photo frame 200 may have the same first to eighth digits, the last four digits of the two codes are randomly generated and thus unique. Therefore, the four digits of random code may also substantially reduce or eliminate the possibility that after a code for a particular digital photo frame 200 has expired, the controller 110 generates an identical code for the same digital photo frame 200. In other words, the controller 110 substantially ensures that the terminal 300 cannot use the expired code to connect to the digital photo frame 200. Thus, the security for the connection between the digital photo frame 200 and the terminal 300 may be further strengthened. In another embodiment, the controller 110 may be configured to generate a longer random code so as to further strengthen the security.

In another embodiment, the code of the present disclosure may be specific to the terminal 300. The controller 110 may retrieve the device information of the terminal 300 from the operation demand transmitted by the terminal 300. The device information may include a serial number, an IP address, and/or a username of the terminal 300. In another embodiment, the controller 110 may use the environment information of the terminal 300. For example, the controller may determine the location and/or the time zone of the terminal 300 according to the IP address of the terminal 300. In another embodiment, the code may be longer than twelve digits to improve the security for the connection between the digital photo frame 200 and the terminal 300. In another embodiment, a different combination or sequence of the above discussed information may be used to form the code.

In another embodiment, the code generated by the controller 110 may be a QR (Quick Response) code. The QR code is a type of matrix barcode containing information encoded according to some encoding rules. In this embodiment, the QR code may contain the same information as the numeral code as discussed above. The terminal 300 may further comprise a scanner configured to read the information contained in the QR code.

In this embodiment as illustrated in FIG. 6B, to improve the security for the connection between the digital photo frame 200 and the terminal 300, the controller 110 may set a predetermined time window during which the code is valid. For example, the controller 110 may predefine that the code is valid for a time window of 24 hours. After 24 hours, the owner of the digital photo frame 200 must click again an "Add Friend" icon on the touch screen 240 to generate an operation command for adding a terminal 300. In another embodiment, even within the above time window, a code may automatically expire (e.g. the code may be voided) once a terminal 300 is successfully connected to the digital photo frame 200 by using the code. Therefore, when the owner of the digital photo frame 200 deletes the connected terminal 300, the terminal 300 cannot use the same code to establish the connection again even within the time window. Thus, the security for the connection between the digital photo frame 200 and the terminal 300 may be further strengthened.

When the controller 110 generates a code, the controller 110 transmits the generated code to the storage 130. The generated code may be stored, for example, in a database of in the storage 130.

When the controller 110 generates the code, the controller 110 also transmits the generated code to the communication unit 120, which then transmits the generated operation command to the communication unit 220 of the digital photo frame 200. The communication unit 220 then transmits the generated code to the controller 210, which then transmits the generated code to the display 242 of the touch screen 240.

As illustrated in FIG. 6B, the owner of the digital photo frame 200 may learn the generated code from the touch screen 240. The owner may then share the code with the terminal 300 by sending a text message containing the generated code, a picture (e.g. screenshot of the generated code), and/or verbal words (e.g. phone call).

In another embodiment, the communication unit 230 of the digital photo frame 200 may directly transmit the generated code to the communication unit 330 of the terminal 300 via the network 400. In another embodiment, when the code is a QR code, the scanner of the terminal 300 may scan the QR code displayed on the touch screen 240 of the digital photo frame 200 and thus the information contained in may be directly entered into the terminal 300.

At act S105, the controller 110 receives a code entered by the user of the terminal 300. Specifically, as illustrated in FIG. 7A, when the user of the terminal 300 clicks an icon on the top right corner of the touch screen 340, the touch screen 340 displays a guidance for the user of the terminal 300 to enter the code shared by the owner of the digital photo frame 200. When the user of the terminal 300 enters the code to generate an operation command for being connected to the digital photo frame 200, the controller 310 receives the generated operation command via the command receiver 341. The controller 310 then transmits the generated operation command to the communication unit 320, which then transmits the generated operation command to the communication unit 120 of the server 100. The communication unit 120 then transmits the generated operation command to the controller 110.

At act S106, the controller 110 determines whether the code entered by the user of the terminal 300 is matched with the generated code. Specifically, the controller 110 first determine whether the code entered by the user of the terminal 300 and the code generated by the controller 110. As discussed above, the generated code may be stored, for example, in a database of the storage 130. The controller may check whether the entered code is present in the database. When the entered code is present in the database, the controller 110 determines that the code entered by the user of the terminal 300 is matched with the code generated by the controller 110 and the method proceeds to act S107. When the entered code is not present in the database, the controller 110 determines that the code entered by the user of the terminal 300 is not matched with the code generated by the controller 110. Thus, the method returns to act S105 for receiving a new code entered by the user of the terminal 300. In another embodiment, the controller 310 may control the display 342 to alert the user of the terminal 300 that an error has occurred.

At act S107, the controller further determines whether the code entered by the user of the terminal 300 is still valid. Specifically, as discussed above, the controller 110 may set a predetermined time window during which the code is valid. Thus, the controller 110 may determine whether the entered code has been generated longer than the predetermined time window. When the controller 110 determines that the entered code has been generated not longer than the predetermined time window, the controller 110 determines that the entered code is valid and the method proceeds to act S107. When the controller 110 determines that the entered code has been generated longer than the predetermined time window, the controller 110 determines the entered code is invalid. Thus, the method returns to act S105 for receiving a new code entered by the user of the terminal 300. In another embodiment, the controller 310 may control the display 342 to alert the user of the terminal 300 that an error has occurred.

In another embodiment, as discussed above, the generated code may automatically expire (e.g. the generated code may be voided) once a terminal 300 is successfully connected to the digital photo frame 200 by using the code. Thus, when the controller 110 determines that the entered code has not been used, the controller 110 determines that the entered code is valid and the method proceeds to act S108. When the controller 110 determines that the entered code has been used, the controller 110 determines the entered code is invalid. In other words, the code generated by the controller 110 is a one-time code. Thus, the method returns to act S105 for receiving a new code entered by the user of the terminal 300.

At act S108, the controller 110 connects the terminal 300 to the digital photo frame 200. In other words, the terminal 300 has an authenticated connection with the digital photo frame 200 and thus may perform operations within its access level assigned by the controller 110. The access level is described below in more details.

2.2 Managing the Connected Terminals and the Registered Digital Photo Frames

Figure 9:
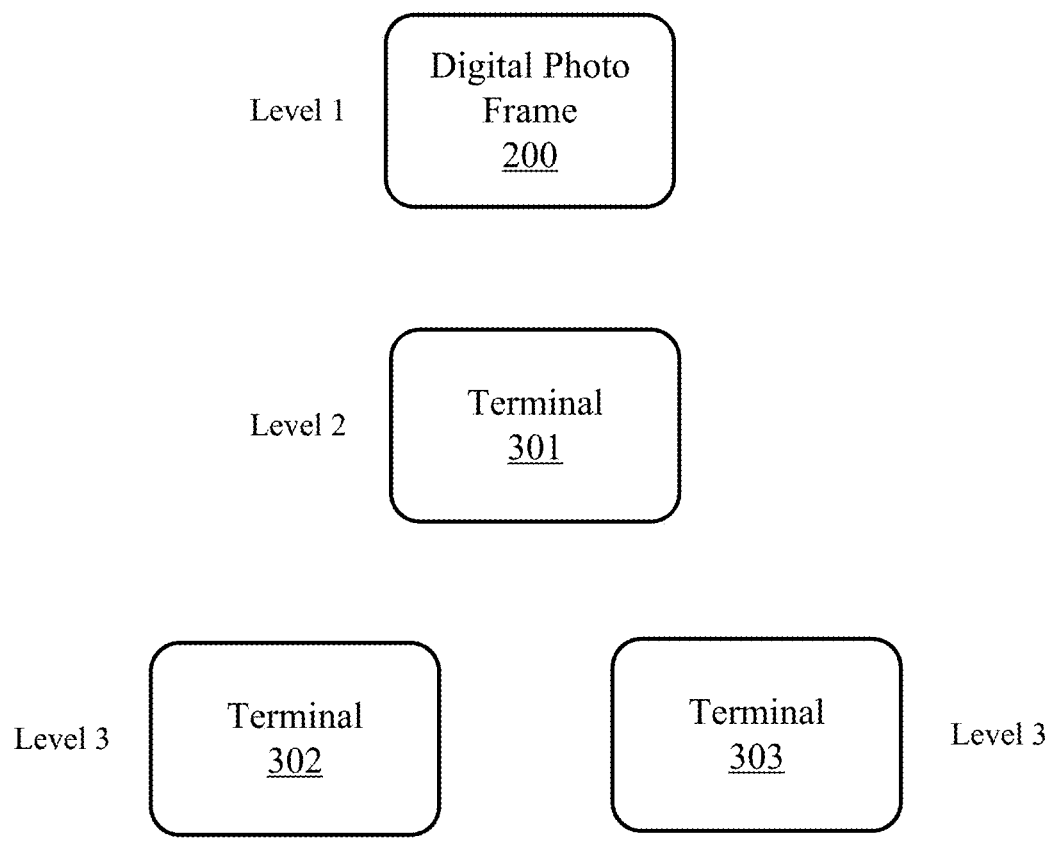
FIG. 9 is a block diagram illustrating a hierarchy of access levels of three terminals and a digital photo frame according to an embodiment of the present disclosure.

FIG. 9 is a block diagram illustrating a hierarchy of access levels of three terminals 301, 302, and 303 and a digital photo frame 200 according to an embodiment of the present disclosure.

In an embodiment, the server 100 may work with the digital photo frame 200 and terminals 301, 302, and 303 to perform the following functions.

Referring to FIG. 5 and FIG. 9, as discussed above, three terminals 301, 302, and 303 may be included in the present disclosure. The controller 110 may assign an access level to each of the terminals 301, 302, and 303 and the digital photo frame 200.

The controller 110 may set a default rule that the digital photo frame 200 has a highest access level (hereinafter "Level 1"). The owner of the digital photo frame 200 plays a role as an administrator to change all of the default rules and create new rules. In an embodiment, the owner of the digital photo frame 200 may change the default rules as discussed in the present disclosure by using the digital photo frame 200. In another embodiment, the owner of the digital photo frame 200 may manage any functions performed by the digital photo frame 200 and any functions performed by any terminals 300 connected thereto by using the digital photo frame 200. In another embodiment, the owner may use the digital photo frame 200 to set or change the access levels of the connected terminals 300. In another embodiment, the owner may use the digital photo frame 200 to disconnect a connected terminal 300.

In another embodiment, the digital photo frame 200 may decide whether to accept or decline the photos/videos transmitted from a terminal 300. For example, the digital photo frame 200 may accept the photos/videos transmitted from some of the terminals 300 while rejecting the photos/videos transmitted from the other terminals 300. For example, when the terminals 301, 302, and 303 establish the authenticated connections with the digital photo frame 200, the owner of the digital photo frame 200 may categorize the terminals 301, 302, and 303 into different groups. For example, the terminal 301 may belong to a group of "family." The terminals 302 and 303 may belong to a group of "friend." Thus, the owner of the digital photo frame 200 may accept the photos/videos transmitted from the group of "family" while declining the photos/videos transmitted from the group of "friend."

In another embodiment, the owner of the digital photo frame 200 may use the digital photo frame 200 to designate one terminal 300 as a remote control configured to control the digital photo frame 200. In another embodiment, the owner may use the digital photo frame 200 to allow one terminal 300 to manage the photos/videos stored in the storage 230.

The controller 110 may assign an intermediate access level (hereinafter "Level 2") to terminal 301. In an embodiment, the user of the terminal 301 may manage, by using the terminal 301, the terminal 302 and the terminal 303, which have a lowest access level (hereinafter "Level 3"). In another embodiment, the terminal 301 may be designated by the owner of the digital photo frame 200 as a remote control to control the digital photo frame 200.

The controller 110 may assign a lowest access level (hereinafter "Level 3") to the terminal 302 and the terminal 303. The following functions performed by the terminal 302 and the terminal 303 may be also performed by the terminal 301 and the digital photo frame 200. In an embodiment, the controller 110 may set a default rule that the user of the terminal 302 or 303, which has been successfully authenticated by the controller 110 and connected to the digital photo frame 200 (hereinafter "connected terminal"), has a right to share the generated code to another user within the predetermined time window as discussed above. The users may share the generated code by using the same methods as discussed above.

In another embodiment, the controller 110 may prohibit the user of the connected terminal 302 or 303 from sharing the generated code with another user. For example, as discussed above, the generated code may automatically expire (e.g. the generated code may be voided) once the terminal 300 is successfully connected to the digital photo frame 200 by using the code. Thus, another user cannot use the expired code to connect his or her terminal 300 to the digital photo frame 200. In another embodiment, the user of the connected terminal 302 or 303 cannot view the generated again after the terminal 302 or 303 is connected to the digital photo frame 200. Thus, the user of the connected terminal 302 or 303 cannot share the generated code to another user.

In an embodiment, one terminal 300 may establish the authenticated connection with a plurality of digital photo frames 200. In this embodiment, when the terminal 302 or 303 is connected to the network 400, the controller 110 may automatically determine which digital photo frames 200 are connected to the network 400 (i.e. whether online or offline). As illustrated in and FIG. 7A and FIG. 7B, the user of the terminal 300, e.g. the terminal 302 or 303, may view, on the touch screen 340, a list of the connected digital photo frames 200 and check the status of each of the connected digital photo frames 200 by clicking the menu icon on the top left corner of the touch screen 340. The user of the terminal 300 cannot select an offline digital photo frame 200 and transmit the photos/videos to the offline digital photo frame 200. The user of the terminal 300, e.g. the terminal 302 or 303 may select one or a plurality of online digital photo frames 200 and transmit the photos/videos to the selected digital photo frame(s) 200 at the same time. In this embodiment, the user of the terminal 302 or 303 disconnects the terminal 302 or 303 with one or more connected digital photo frames 200 or connect the terminal 302 or 303 with one or more new digital photo frames 200.

In another embodiment, the user of the terminal 300 may view, on the touch screen 340, the photos/videos having been transmitted to the digital photo frame and/or the photos/videos stored in the storage 330.

In another embodiment, the controller 110 may set a default rule that the user of the terminal 302 may use the terminal 302 to delete the photos/videos transmitted by the terminal 302 from the digital photo frames 200. Likewise, the controller 110 may set a default rule that the user of the terminal 303 may use the terminal 303 to delete the photos/videos transmitted by the terminal 303 from the digital photo frames 200. In this embodiment, the user of the terminal 302 or 303 may review the transmission history by using the terminal 302 or 303.

In an embodiment, when the controller 110 manages the connected terminals and the registered digital photo frames, the controller 110 may store the above information related to the terminals and the registered digital photo frames in a database of the storage 130.

The above discussed functions and other functions are described below in more details.

2.3 Managing the Transmission of Photos/Videos and the Transmitted Photos/Videos Referring to FIG. 1, FIG. 2, and FIG. 3, in an embodiment, the server 100 may function as a relay or a hub configured to transmit the photos/videos from the terminal 300 to the digital photo frame 200. In an embodiment, the transmission may be in both directions, i.e. from the terminal 300 to the digital photo frame 200 and from the digital photo frame 200 to the terminal 300. For example, the terminal 302 may transmit the photos/videos to the frame 200 via the server 100 and the frame 200 may transmit these photos/videos to the terminal 301 via the server 100. The transmission from the digital photo frame 200 to the terminal 300 may be performed in the similar way as discussed in the present disclosure. In another embodiment, the transmission may be in either direction.

In an embodiment, when the terminal 300 establishes an authenticated connection with the digital photo frame 200, the user of the terminal 300 may select the photos/videos stored in the storage 330. The controller 310 controls the communication unit 320 to transmit the selected photos/videos to the communication unit 120 of the server 100, which then transmits to the storage 130. The controller 110 then transmits the photos/videos stored in the storage 130 to the communication unit 120, which then transmits the photos/videos to the communication unit of 220 of the digital photo frame 200. Then, the controller 210 transmits the photos/videos from the communication unit 220 to the storage 230.

In this embodiment, once the photos/videos are successfully transmitted from the terminal 300 to the digital photo frame 200, the controller 110 may automatically delete the copies of the transmitted photos/videos stored in the storage 130. Therefore, this may save the storage space of the server 100 and thus the maintenance cost for the server 100 may be significantly reduced. This may also protect the privacy of the users and the owners because the transmitted photos and videos are only stored in the digital photo frame 200 and the terminal 300.

In this embodiment, the controller 110 may scan whether the photos/videos transmitted from the terminal 300 contain virus. When the controller 110 determine that the photos/videos do not contain virus, the controller 110 then performs the above discussed steps. When the controller 110 determines that the photos/videos contain virus, the controller 110 deletes the photos/videos in the storage 130, terminates the transmission, and alerts the user of the terminal 300 that an error has occurred.

Referring to FIG. 4, in another embodiment, the terminal 300 and the digital photo frame 200 may perform a Peer to Peer transmission (hereinafter "P2P transmission"). In other words, the terminal 300 may directly transmit the photos/videos to the digital photo frame 200 without the server 100. Specifically, when the terminal 300 establishes an authenticated connection with the digital photo frame 200, the user of the terminal 300 may select the photos/videos stored in the storage 330. The controller 310 controls the communication unit 320 to transmit the selected photos/videos to the communication unit 220 of the digital photo frame 200, which then transmits to the storage 230.

In an embodiment, the P2P transmission may be in both directions, i.e. from the terminal 300 to the digital photo frame 200 and the digital photo frame 200 to the terminal 300. For example, the terminal 302 may transmit directly the photos/videos to the frame 200 and the frame 200 may transmit directly these photos/videos to the terminal 301. The transmission from the digital photo frame 200 to the terminal 300 may be performed in the similar way as discussed in the present disclosure. In another embodiment, the P2P transmission may be in either direction.

In another embodiment, the server 100 may oversee the P2P transmission between the terminal 300 and the digital photo frame 200. For example, while the P2P transmission is being performed, the controller 110 of the server 100 may continue to monitor whether the digital photo frame 200 is connected to the network 400 and/or monitor whether the digital photo frame 200 has been disconnected to the digital photo frame 200. If so, the server 100 may alert the user of the terminal 300 that an error has occurred and terminate the P2P transmission.

Therefore, the transmission of the is not subject to the distance between the terminal 300 and the digital photo frame 200 or the locations of the terminal 300 and the digital photo frame 200.

In another embodiment, as discussed above, the user of the terminal 300 may use the terminal 300 to delete the photos/videos, transmitted by the terminal 300, from the storage 230 of the digital photo frame 200. Also, the owner of the digital photo frame 200 may delete the photos/videos stored in the storage 230. Specifically, the controller 310 or 210 may receive an operation command from the terminal 300 or the digital photo frame 200 and transmit the received operation command to the controller 110 via the communication unit 320 or 220 and the communication unit 120. The controller 110 may determine whether the terminal 300 or the digital photo frame 200 has an access level to perform the deletion as discussed above. When the controller 110 determines that the terminal 300 or the digital photo frame 200 has the corresponding access level to perform the deletion, the controller 110 may transmit a control signal to the controller 310 or 210 via the communication unit 120 and the communication unit 320 or 220. Then, the controller 310 or 210 may delete the photos/videos from the storage 230 of the digital photo frame 200.

In an embodiment, the controller 110 or 210 is further configured to hide some of the photos/videos. Thus, the hidden photos/videos are not displayed via the display 242. However, the hidden photos/videos are not deleted from the storage 230.

2.4 Remotely Controlling the Digital Photo Frame by the Terminal

As discussed above, in an embodiment, the owner of the digital photo frame 200 may use the digital photo frame 200 to designate one terminal 300 as a remote control configured to control the digital photo frame 200.

Specifically, in an embodiment, the owner of the digital photo frame 200 may designate the terminal 301 as a remote control because the terminal 301 has a higher access level than the terminals 302 and 303 as illustrated in FIG. 9. Specifically, the controller 110 receives, from the controller 210, an operation command for designating the terminal 301 as the remote control and updates the status of the terminal 301 in the database of the storage 130. Then, the controller 110 transmits a control signal to the display 242 and the display 342 to display words indicating that the terminal 301 is now a remote control. Thus, the user of the terminal 301 may use the terminal 301 to remotely control the digital photo frame 200 to perform the functions discussed in the present disclosure.

Therefore, when the location of the owner of the digital photo frame 200 is different from the location of the digital photo frame 200, the owner still may use his or her cellphone or a trusted person's cellphone as a remote control the digital photo frame 200. For example, while working in the office, parents may want to limit the photos/videos displayed to their children at home. The digital photo frame 200 of the present disclosure may allow the parents to remotely operate the digital photo frame 200 and thus manage the photos/videos to be displayed to the children at home. Thus, the digital photo frame 200 of the present disclosure may provide a more convenient way for the owner to manage the photos/videos stored in the digital photo frame 200 or change the settings of the digital photo frame 200.

2.5 Managing the External Storage Device and the Photos/Videos Stored in the External Storage Device As discussed above, in an embodiment, the interface 250 of the digital photo frame 200 is configured to be connected to an external storage device or import the photos/videos from the external storage devices into the storage 230 of the digital photo frame 200. In another embodiment, the interface 250 is further configured to export the photos/videos stored in the storage 230 into the external storage device.

In an embodiment, the controller 110 or the controller 210 may transmit a control signal to the display 242 to display words indicating a status of the external storage device when the external storage device is plugged into or unplugged from the interface 250.

In another embodiment, the controller 210 of the digital photo frame 200 may directly read and/or display the photos/videos stored in the external storage devices without importing the photos/videos.

In another embodiment, when the photos/videos are imported from an external storage device into the storage 230 of the digital photo frame 200 via the interface 250, the controller 210 may read information regarding the imported photos/videos and transmit the information to the controller 110. Then, the controller 110 may store the information regarding the imported photos/videos in a database of the storage 130 (hereinafter "stored information"). For example, the information may include the file sizes and the file dates of the photos/videos.

Later, when an external storage device (either the same external storage device or another external storage device) is plugged into the interface 250, the controller 210 may read information regarding photos/videos stored in the external storage device (hereinafter "new information") and transmit the new information to the controller 110. The controller 110 may compare the new information with the stored information. When the controller 110 determines the stored information and the new information are identical, the controller 110 determines that the photo/video corresponding to the identical information has been imported (i.e. present in the storage 230) and thus label the photo/video as "imported file." Thus, the controller 110 transmits a control signal, instructing the controller 210 not to import the imported file to the digital photo frame 200 again. When the controller 110 determines the stored information and the new information are different, the controller 110 determines that the photo/video corresponding to the different information has not been imported (i.e. present in the storage 230) and thus label the photo/video as "unimported file." Thus, the controller 110 transmits a control signal, instructing the controller 210 to import the unimported file to the digital photo frame 200.

Likewise, when the photos/videos are exported from the digital photo frame 200 into an external storage device via the interface 250, the controller 110 may store the information regarding the exported photos/videos in a database of the storage 130 (hereinafter "stored information") in the similar way as discussed above.

Later, when an external storage device (either the same external storage device or another external storage device) is plugged into the interface 250 and the owner of digital photo frame 200 selects some photos/videos to be exported into the external storage device, the controller 210 may read information regarding the photos/videos to be exported (hereinafter "new information") and transmit the new information to the controller 110. The controller 110 may compare the new information with the stored information in the same way as discussed above. Thus, the controller 110 may label the photo/video corresponding to the identical information as "exported file" (i.e. present in the external storage device) and the photo/video corresponding to the different information as "unexported file" (i.e. not present in the external storage device). Thus, the controller 110 transmits a control signal, instructing the controller 210 not to export the exported file to the external storage device again and transmits a control signal, instructing the controller 210 to export the unexported file to the external storage device.

The file sizes and the file dates of the photos/videos are used in the comparison as discussed above because the information may substantially ensure that two photos/videos with different file sizes and file dates also have different contents. Therefore, the system of the digital photo frame according to the present disclosure may prevent the duplicate photos/videos from being imported into the digital photo frame 200 or exported into the external storage device again. Thus, this may save the storage spaces of the digital photo frame 200 and the external storage device.

2.6 Displaying the Photos/Videos Stored in the Digital Photo Frame and the External Storage Device As discussed above, in an embodiment, the owner of the digital photo frame 200 may categorize the terminals 301, 302, and 303 into different groups. For example, the owner of the digital photo frame 200 may only select to display the photos/videos transmitted from the group of "family."

In another embodiment, the controller 210 may categorize the photos/videos stored in the storage 230 of the digital photo frame 200 or the external storage device according to the contents of the photos/videos. The contents may include, for example, person, location, scene, and object in the photos/videos. For example, the contents of the photos/videos may be automatically detected by an artificial intelligence technology or manually detected by the owner of the digital photo frame 200. To automatically detect the contents of the photos/videos, the controller 210 may control to perform an image recognition by applying an algorithm to the image data of the the photos/videos. To manually detect the contents of the photos/videos, the controller 210 may retrieve the file names of the the photos/videos. Thus, the controller 210 may label the groups with different group names. For example, the owner of the digital photo frame 200 may only select to display the photos/videos in the group of "Chicago."

In another embodiment, the owner of the digital photo frame 200 may label the photos/videos of interest as a group of "favorite." Thus, the owner of the digital photo frame 200 may only select to display the photos/videos in the group of "favorite." The owner of the owner of the digital photo frame 200 may also remove a photo/video from the group of "favorite."

Thus, the owner of the digital photo frame 200 may display the photos/videos according to the groups. For example, the owner of the digital photo frame 200 may only select to display the photos/videos transmitted from the group of "family."

In another embodiment, the digital photo frame 200 further comprises a sensor configured to detect whether a person enters an area within a predetermined distance from the digital photo frame 200. For example, the sensor may be an infrared sensor configured to detect the body temperature of a person. When the sensor detects that a person enters the area within the predetermined distance from the digital photo frame 200, the controller 210 may change the digital photo frame 200 to or maintain the digital photo frame 200 in an "awake status." When the sensor detects that a person leaves the area within the predetermined distance from the digital photo frame 200, the controller 210 may control the display 242 to stop displaying the photos/videos and may change the digital photo frame 200 to or maintain the digital photo frame 200 in an "sleep status."

In another embodiment, when the photos/videos are transmitted or imported to the digital photo frame 200, the controller 210 may transmit a control signal to the display 242 to display an option for the owner to adjust the size of the photos/videos to be displayed. For example, when the owner selects to adjust the size of the photos/videos to be displayed, the controller 210 may automatically adjust the size of the photos/videos to be displayed to fit the size of the display 242. In another embodiment, the owner may manually adjust the size of the photos/videos to be displayed. In another embodiment, the owner may manually select an area of the photos/videos to be enlarged. For example, the touch screen 240 may display a circle for the owner to adjust the size of the photos/videos by increasing or reducing the size of the circle or to select the area of the photos/videos by moving the circle to an appropriate position. In response, the controller 210 may zoom in the enlarged area while zooming out the unselected area of the photos/videos.

In an embodiment, the controller 210 or the controller 110 may set a default rule that the photos/videos are displayed in the form of a slide show. Thus, photos/videos are displayed in a predetermined sequence and at a predetermined interval. In another embodiment, the owner of the digital photo frame 200 may manually change the sequence and the interval. In an embodiment, in response to an operation command from the owner of the digital photo frame 200, the controller 210 may pause or resume the slide show of the photos/videos. In an embodiment, in response to an operation command from the owner of the digital photo frame 200, the controller 210 may transmit a control signal to the display 242 to pause or resume the slide show of the photos/videos. In another embodiment, in response to an operation command from the owner of the digital photo frame 200, the controller 210 may transmit a control signal to the display 242 to display a plurality of photos/videos at the same time.

2.7 Other Functions

In an embodiment, the owner of the digital photo frame 200 may transmit, to the controller 110 via the controller 210, the communication unit 220, and the communication unit 120, an operation command for diagnosing whether the hardware of the digital photo frame 200 has any technical issues.

In another embodiment, when the digital photo frame 200 is connected to the server 100 via the network 400, the controller 110 may automatically diagnose whether the hardware of the digital photo frame 200 has a technical issue.

Specifically, in response to the operation command or the connection between the digital photo frame 200 and the terminal 300, the controller 210 may collect information/parameter regarding the hardware elements and transmit the collected information/parameter to the controller 110 via the communication unit 220 and the communication unit 120. Then, the controller 110 may detect whether the information/parameter is abnormal by comparing the information/parameter with normal hardware properties. For example, the normal hardware properties may include ranges within which the hardware of the digital photo frame 200 may work normally. When the controller 110 determines that the information/parameter falls within the ranges, the controller 110 determines that the hardware of the digital photo frame 200 has no technical issue. When the controller 110 determines that the information/parameter falls beyond the ranges, the controller 110 determines that the hardware of the digital photo frame 200 has a technical issue. The controller 110 may then transmit the corresponding diagnosis result to the digital photo frame 200 via the communication unit 120 and the communication unit 220.

In an embodiment, the server 100 may be further connected with an external weather database. When the digital photo frame 200 is connected to the server 100 via the network 400, the controller 110 may determine the controller 110 may determine the location and/or the time zone of the digital photo frame 200. Thus, the controller 110 may automatically retrieve, from the external weather database, the weather information corresponding to the location and/or the time zone of the digital photo frame 200. Then, the controller 110 may transmit the retrieved weather information to the display 242 and thus the display 242 may display the retrieved weather information as well as the time information in real time. The information may be automatically updated, e.g. at a predetermined time interval. In an embodiment, the owner of the digital photo frame 200 may change the unit of the information or disable this function.

In an embodiment, the storage 230 is further configured to store a plurality of audio files, which may be used as notification sounds. The controller 210 is further configured to select the notification sound from the stored audio files in response to an operation command from the owner of the digital photo frame 200.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, should be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system for sharing photos or videos with a digital photo frame, the system comprising:
    a server configured to generate a code for establishing a connection between the digital photo frame and at least one terminal and configured to receive a code transmitted by the at least one terminal; and
    the digital photo frame, configured to be connected to the server via a network, the digital photo frame comprising:
        a controller configured to receive an operation command for generating a code and transmit the received operation command for generating a code to the server via the network,
    wherein in response to the received operation command for generating a code, the server generates a code and transmits the generated code to the controller of the digital photo frame,
    wherein the server is further configured to connect the at least one terminal to the digital photo frame when determining that the code entered by the at least one terminal is matched with the generated code,
    wherein the service is further configured to instruct the digital photo frame to receive the photos or the videos from the at least one connected terminal when the at least one terminal is connected to the digital photo frame,
    wherein the generated code comprises a numeral code or a quick response (QR) code including information of the digital photo frame and a randomly generated code.

2. The system according to claim 1,
    wherein the server is further configured to determine whether the digital photo frame is registered on the server before generating the code to the digital photo frame.

3. The system according to claim 2,
    wherein the server is further configured to determine whether the digital photo frame is connected to the server via the network before generating the code to the digital photo frame.

4. The system according to claim 3,
    wherein the server is further configured to determine whether the entered code is valid before connecting the digital photo frame to the at least one terminal.

5. The system according to claim 4,
    wherein the server is further configured to assign the generated code a predetermined time window, and
    wherein the generated code is valid during the predetermined time window.

6. The system according to claim 5,
    wherein the server is further configured to void the generated code once the at least one terminal is connected to the digital photo frame by using the generated code.

7. The system according to claim 6,
    wherein the code generated by the server is specific to the digital photo frame or the at least one terminal.

8. The system according to claim 7,
    wherein the controller of the digital photo frame is further configured to designate a terminal of the at least one connected terminal as a remote control, and
    wherein the designated terminal is configured to remotely control the digital photo frame.

9. The system according to claim 8,
wherein the server is further to assign a highest access level to the digital photo frame.

10. The system according to claim 9,
wherein when the server connects a plurality of terminals to the digital photo frame, the server is further configured to assign an access level to each of the plurality of connected terminals.

11. The system according to claim 7,
wherein the generated code further comprises a numeral code or a QR code including information of the at least one terminal and a randomly generated code.

12. A digital photo frame for receiving photos or videos transmitted from at least one terminal, the digital photo frame comprising:
a controller;
a communication unit communicably connected to the controller and configured to communicate with a server and the at least one terminal via a network;
a display communicably connected to the controller and configured to receive an operation command for generating a code and transmit the operation command to the controller, wherein the code is generated to establish a connection between the digital photo frame and at least one terminal; and
a storage communicably connected to the controller and configured to store the received photos or the videos,
wherein in response to the operation command transmitted from the display, the controller is configured to request, via the communication unit, the server to generate a code for establishing a connection between the digital photo frame and at least one terminal,
wherein in response to the established connection between the digital photo frame and at least one terminal, the controller is further configured to control the communication unit to receive the photos or the videos from the at least one connected terminal and control the storage to store the received photos or the videos, and
wherein the generated code comprises a numeral code or a quick response (QR) code including information of the digital photo frame and a randomly generated code.

13. The digital photo frame according to claim 12,
wherein the controller of the digital photo frame is further configured to designate a terminal of the at least one connected terminal as a remote control, and
wherein the designated terminal is configured to remotely control the digital photo frame.

14. The digital photo frame according to claim 13, further comprising:
an interface communicably connected to the controller and configured to be connected to an external storage device,
wherein the controller is further configured to import photos or videos from the external storage device into the storage, and
wherein the server is configured to determine, before the importation, whether the photos or the videos to be imported from the external storage device are present in the storage.

15. The digital photo frame according to claim 14,
wherein the controller is further configured to export photos or videos from the storage into the external storage device, and
wherein the server is configured to determine, before the exportation, whether the photos or the videos to be exported from the storage are present in the external storage device.

16. A method for sharing photos or videos with a digital photo frame, the method comprising:
receiving, by a server, an operation command for connecting at least one terminal to the digital photo frame;
generating and transmitting, by the server, a code to the digital photo frame in response to the received operation command;
determining, by the server, whether a code entered by the at least one terminal is matched with the generated code;
connecting, by the server, the at least one terminal to the digital photo frame when determining that the code entered by the at least one terminal is matched with the generated code; and
instructing, by the server, the digital photo frame to receive the photos or the videos from the at least one connected terminal,
wherein the generated code comprises a numeral code or a quick response (QR) code including information of the digital photo frame and a randomly generated code.

17. The method according to claim 16, further comprising:
determining, by the server, whether the digital photo frame is registered on the server before generating the code to the digital photo frame; and
determining, by the server, whether the digital photo frame is connected to the server via a network when determining the digital photo frame is registered on the server.

18. The method according to claim 17, further comprising:
determining, by the server, whether the entered code is valid before connecting the digital photo frame to the at least one terminal.

19. The method according to claim 18, further comprising:
assigning, by the server, the generated code a predetermined time window,
wherein the generated code is valid during the predetermined time window.

20. The method according to claim 12, wherein the generated code further comprises a numeral code or a QR code including information of the at least one terminal and a randomly generated code.

* * * * *